3/5/86 XR 4,604,224

United States Patent [19]
Cheng

[11] Patent Number: 4,604,224
[45] Date of Patent: Aug. 5, 1986

[54] ZEOLITE CONTAINING HEAVY DUTY NON-PHOSPHATE DETERGENT COMPOSITION

[75] Inventor: Bao-Ding Cheng, Kendall Park, N.J.

[73] Assignee: Colgate Palmolive Co., New York, N.Y.

[21] Appl. No.: 753,360

[22] Filed: Jul. 8, 1985

Related U.S. Application Data

[63] Continuation of Ser. No. 702,863, Feb. 20, 1985, abandoned, which is a continuation of Ser. No. 659,863, Oct. 11, 1984, abandoned, which is a continuation of Ser. No. 530,428, Sep. 8, 1983, abandoned, which is a continuation of Ser. No. 32,749, Apr. 29, 1979, abandoned, which is a continuation of Ser. No. 785,473, Apr. 7, 1977, abandoned, which is a continuation of Ser. No. 640,794, Dec. 15, 1975, abandoned, which is a continuation-in-part of Ser. No. 467,688, May 7, 1974, abandoned.

[51] Int. Cl.[4] .......... B01J 39/14; C02F 1/42; C11D 3/12; C11D 11/00

[52] U.S. Cl. .......... 252/91; 252/95; 252/99; 252/140; 252/174.25; 252/179; 252/540

[58] Field of Search .......... 252/95, 99, 131, 140, 252/174.25, 179, 91

[56] References Cited

U.S. PATENT DOCUMENTS

| | | | |
|---|---|---|---|
| 3,519,570 | 7/1970 | McCarty | 252/135 |
| 3,962,149 | 6/1976 | Chirash | 252/540 |
| 3,982,892 | 9/1976 | Gray | 8/111 |
| 4,006,110 | 2/1977 | Kenney | 252/540 |
| 4,083,793 | 4/1978 | Jakobi | 252/99 |
| 4,274,975 | 6/1981 | Corkill | 252/140 |

*Primary Examiner*—Dennis L. Albrecht
*Attorney, Agent, or Firm*—Kenyon & Kenyon

[57] ABSTRACT

A phosphorus-free heavy duty synthetic organic detergent composition of improved cleaning power which includes certain proportions of sodium linear higher alkylbenzene sulfonate, molecular sieve zeolite, preferably type 4A molecular sieve zeolite, percompound oxidizing agent which is either an alkali metal perborate tetrahydrate, an alkali metal percarbonate, an alkali metal carbonate peroxide or a mixture thereof, and sodium silicate of $Na_2O$:$SiO_2$ ratio in the range of 1:1 to 1:3.2. Preferably, the product also includes higher fatty alcohol polyethoxylate detergent. The invented product demonstrates good soil removal properties when compared with similar products containing a pentasodium tripolyphosphate builder salt. Methods of laundering fabrics with the invented compositions are also described.

1 Claim, No Drawings

ZEOLITE CONTAINING HEAVY DUTY NON-PHOSPHATE DETERGENT COMPOSITION

CROSS-REFERENCE TO RELATED APPLICATIONS

This application is a continuation of application Ser. No. 702,863 filed Feb. 20, 1985 which is a continuation of application Ser. No. 659,863 filed Oct. 11, 1984 which is a continuation of application Ser. No. 530,428 filed Sept. 8, 1983 which is a continuation of application Ser. No. 032,749 filed Apr. 29, 1979 which is a continuation of application Ser. No. 785,473 filed Apr. 7, 1977 which is a continuation of application Ser. No. 640,794 filed Dec. 15, 1975 which is a continuation-in-part of application Ser. No. 467,688 filed May 7, 1974; all prior applications being now abandoned.

This invention relates to non-phosphate heavy duty laundry detergent compositions. More particularly, it relates to such compositions which include particular proportions of certain percompounds together with molecular sieve zeolite, linear higher alkylbenzene sulfonate, sodium silicate and anti-redeposition agent and which have soil removal properties comparable to those of similar compositions wherein pentasodium tripolyphosphate is employed as the builder salt (instead of the mixture of molecular sieve zeolite, the silicate and the percompound). The present compositions do not cause objectionable redeposition of particulate materials on washed laundry, in this respect being better than similar compositions in which the percompound is not present and in which the proportion of molecular sieve zeolite is greater so as to promote detergency due to its additional builder effect. Stated differently, the present invention is of the use in heavily molecular sieve zeolite-built non-phosphate detergent compositions based on linear higher alkylbenzene sulfonate of a certain proportion of a certain percompound in partial replacement of the zeolite, together with sodium silicate to improve detergency and anti-redeposition properties of the composition in washing operations.

It is well known that due to claims that phosphorus contributes to eutrophication of inland waters, legislation has been passed in various jurisdictions in the United States limiting phosphorus contents of detergent products. Because pentasodium tripolyphosphate had been the most successful builder salt for synthetic anionic organic detergent compositions and is comparatively harmless to humans, elimination of such builder or even diminution in the proportion of it allowed to be employed in detergent compositions resulted in unsatisfactory products. Accordingly, much research has been done in an effort to discover ecologically acceptable builder salts. Trisodium nitritriacetate (NTA), while being successfully utilized in detergent compositions marketed in Canada is still not being employed in the United States because of experimental testing that had indicated it to be carcinogenic. Salts of various aminopolycarboxylic acids and iminopolycarboxylic acids have been suggested for use as builders but these are often too expensive to be commercially competitive or are unavailable in the tonnage quantities required for commercial use. Similar problems exist with respect to the salts of polycarboxylic acids, such as sodium citrate and sodium gluconate. Additionally, such replacements for phosphates contribute to the biological oxygen demand (BOD) of waste waters containing them, which sometimes may be objectionable.

Recently it has been suggested to utilize molecular sieve zeolites as inorganic builders for detergent compositions. Detergent compositions containing such compounds are described in U.S. patent application Ser. No. 467,688, of which this application is a continuation-in-part. The molecular sieve zeolites have also been described in German Offenlegungsschriften 2,412,837; 2,412,838; and 2,412,839. All of the mentioned patent applications are hereby incorporated by reference.

The molecular sieve zeolites, as builders for synthetic organic detergent compositions, are especially useful in non-phosphate products and are sufficiently effective in commercially competitive proportions in built heavy duty laundry detergents to allow the use of quantities thereof which make compositions of good detergency, comparable to that obtained with phosphate-containing products. The molecular sieve zeolites contain only aluminum, silicon, oxygen and hydrogen plus the alkali metal or other solubilizing metal or cation incorporated into the zeolite structure. Thus, the biological oxygen demand of the product is essentially nil and of course, it contains no phosphorus. Because of its solid (powdered) form it does not create processing problems which might otherwise be associated with liquids or waxy materials. However, experimentation has shown that this solid form and the characteristics of the molecular sieve do cause certain disadvantageous effects. Because the molecular sieve zeolites are in the forms of very small crystals there is a dusting problem but this may be minimized by spray drying them with a crutcher mix containing most of the other components of the detergent or in some cases it may be useful to mix the molecular sieve zeolite powder with any normally tacky, caking and poorly flowing detergent composition components, thereby decreasing such tackiness, etc. In washing however, when employing fairly large quantities of molecular sieve zeolite, which are usually desirable to replace the building effects of the "omitted phosphates", it has been noted that the laundry washed, especially dark colored laundry, becomes lighter in appearance, apparently due to the deposition of some zeolite thereon. Although such lightening might not be objectionable for white or light colored items it should not be tolerated in a commercial product intended for general laundry use. The normal proportion of anti-redeposition agent, such as sodium carboxymethyl cellulose, that is employed in heavy duty detergent compositions using phosphate builder is usually not effective to maintain the molecular sieve zeolite dispersed to such an extent that it does not deposit on the laundry, which appears to happen most during draining of the washing machine tube and rinsing. When lesser quantities of molecular sieve zeolite are used in such compositions from which phosphate has been omitted there is a noticeable diminution in washing properties of the composition. Of course, by utilizing supplementary builders their building effects may be added to those of the diminished proportion of molecular sieve zeolite and sometimes satisfactory washing is obtainable from such products. However, in following the present invention it is not necessary to utilize such a supplementary builder. Yet the desired improved washing properties are obtained without the accompanying objectionable deposition of the molecular sieve zeolite and other particulate materials from the wash water onto the laundry. Additionally, if a percompound activator is incorporated in the present composition or is added to the wash water so as to promote release of active oxygen from the percompound additional desirable effects due to the release of the oxygen will be obtained. In such cases and also when the wash water is raised to a considerably elevated temperature, e.g., about 70°-95° C., the active oxygen released from the percompound will have a noticeable and desirable bleaching and sterilizing or antibacterial effect.

In accordance with the present invention a phosphorus-free heavy duty synthetic organic detergent composition comprises 5 to 25% of higher linear alkylbenzene sulfonate wherein the higher alkyl is of 10 to 16 carbon atoms, 12 to 25% of molecular sieve zeolite, 12 to 25% of percompound oxidizing agent selected from the group consisting of alkali metal perborate tetrahydrate, alkali metal percarbonate and alkali metal carbonate peroxide and mixtures thereof, and 5 to 20% of sodium silicate of $Na_2O:SiO_2$ ratio in the range of 1:1 to 1:3.2. In preferred embodiments of the invention the molecular sieve zeolite is a hydrated type 4A zeolite, the percompound is sodium perborate tetrahydrate or sodium carbonate peroxide, the anti-redeposition agent is sodium carboxymethyl cellulose, the sodium silicate is of $Na_2O:SiO_2$ ratio of about 1:2.4 and the composition contains 0.5 to 20% of nonionic detergent, e.g., higher fatty alcohol polyethoxylate, and soap. Also within the invention are methods of washing laundry utilizing the described compositions.

The molecular sieve zeolites utilized in making the invented detergent compositions are water insoluble crystalline aluminosilicate zeolites of natural or synthetic origin which are characterized by having a network of uniformly sized pores in the range of about 3 to 10 Angstroms, preferably about 4 Å (nominal), which size is uniquely determined by the unit structure of the zeolite crystal. Of course, zeolites containing two or more such networks of different size pores can also be employed.

The molecular sieve zeolite should also be a univalent cation-exchanging zeolite, i.e., it should be an aluminosilicate containing a univalent cation such as sodium, potassium or lithium, when practicable. Preferably, the univalent cation associated with the zeolite molecular sieve is an alkali metal cation, especially sodium or potassium, most preferably sodium.

Crystalline types of zeolites utilizable as molecular sieves in the invention, at least in part, include zeolites of the following crystal structure groups: A, X, Y, L, mordenite and erionite. Mixtures of such molecular sieve zeolites can also be useful, especially when type A zeolite, e.g., type 4A, is present. These preferred crystalline types of zeolites are well known in the art and are more particularly described in the text, *Zeolite Molecular Sieves,* by Donald W. Breck, published in 1974 by John Wiley & Sons. Typical commercially available zeolites of the aforementioned structural types are listed in Table 9.6 at pages 747-749 of the Breck text, which table is incorporated herein by reference.

Preferably the molecular sieve zeolite used in the invention is a synthetic molecular sieve zeolite. It is also preferable that it be of type A crystalline structure, more particularly described at page 133 of the aforementioned text. Especially good results are generally obtained in accordance with the invention when a type 4A molecular sieve zeolite is employed wherein the univalent cation of the zeolite is sodium and the pore size of the zeolite is about 4 Angstroms. The especially preferred zeolite molecular sieves are described in U.S. Pat. No. 2,882,243, which refers to them as Zeolite A.

Molecular sieve zeolites can be prepared in either a dehydrated or calcined form, the latter form containing from less than about 1.5% to about 3% of moisture, or in a hydrated or water loaded form, which contains additional water of hydration and adsorbed water in an amount up to about 20 to 30% of the zeolite total weight, depending on the type of zeolite employed. Normally a completed hydrated type 4A synthetic zeolite will be of the formula $$(Na_2O)_6(Al_2O_3)_6(SiO_2)_{12}.27H_2O \text{ or}$$

$$Na_{12}(AlO_2.SiO_2)_{12}.27H_2O,$$

when completely molecularly hydrated. However, this product can still adsorb or absorb additional moisture so that the upper limit in moisture content is not about 22%, as calculated, but may be higher. Preferably, hydrated or partially hydrated forms of the molecular sieve zeolite are employed in the practice of this invention and these usually have a water content of 20 to 28.5%, e.g., 20 to 22%. The manufacture of such crystals is well known in the art. For example, in the preparation of Zeolite A, referred to above, the partially hydrated or hydrated zeolite crystals that are formed in the crystallization medium (such as hydrous amorphous sodium aluminosilicate gel) are made without the high temperature dehydration (calcining to 3% or less water content) that is normally practiced in preparing such crystals for use as catalysts, e.g., cracking catalysts. The preferred form of zeolite in partially hydrated form can be recovered by filtering off the crystals from the crystallization medium and drying them in air at ambient temperature to such an extent that the water content thereof is as desired.

Usually the molecular sieve zeolite should be in finely divided condition, such as crystals (amorphous or poorly crystalline particles may also find some use) having mean particle diameters in the range of about 0.5 to about 12 microns, preferably 5 to 9 microns and especially about 5.9 to 8.3 microns, e.g., 6.4 to 8.3 microns.

The percompounds which may be employed and are found to improve the detergency of the linear higher alkylbenzene sulfonate-based detergents in conjunction with the molecular sieve zeolite and sodium silicate are inorganic materials, preferably salts, such as metal salts, more preferably alkali metal or alkaline earth metal salts and most preferably the sodium (and potassium) salts of inorganic peracids. Sodium perborate, sodium percarbonate and sodium carbonate peroxide are members of this group which are most effective in the present compositions. These may be employed in anhydrous or hydrated forms. For example, when the perborate is employed the tetrahydrate is preferred but the monohydrate and other hydrated forms and the anhydrous form are also useful. Various activators for the percompounds may be employed but surprisingly, their presence is not necessary for obtaining the desired good cleaning effects for the invented compositions.

The sodium silicate component of the invented compositions is of $Na_2O:SiO_2$ ratio in the range of 1:1 to 1:3.2, preferably 1:2 to 1:2.6 and most preferably about 1:2.4, e.g., 1:2.35. Such compound is especially useful in the present compositions for its combination anti-corrosion and building effects in conjunction with the molecular sieve zeolite and percompound. The silicate is especially good as a builder in wash waters containing magnesium ions and thereby usefully complements the molecular sieve zeolite builder under usual washing conditions (because most wash waters contain both magnesium and calcium hardness ions).

The linear higher alkylbenzene sulfonate detergent will usually be of 10 to 16 carbon atoms, preferably 12 to 14 carbon atoms and most preferably about 13 carbon atoms and will normally be neutralized with a suitable alkaline material, of which the most preferred are such which result in alkali metal linear higher alkylbenzene sulfonates being produced, preferably the sodium salts of the linear higher alkylbenzene sulfonic acid. Other synthetic anionic organic detergents may be present with the linear higher alkylbenzene sulfonates but normally will only constitute a minor proportion of the total anionic detergent content of the present compositions. Such supplementing anionic detergents may be of 8 to 26, preferably 12 to 22 carbon atoms per molecule and usually will include an alkyl or other aliphatic chain containing about 8 to 18 carbon atoms, preferably 10 to 16 carbon atoms and most preferably being straight chain alkyl. Such anionic detergents include the alpha-olefin sulfonates, paraffin sulfonates, ethoxylated alcohol sulfates, alkyl sulfates and sulfated higher alkyl phenyl polyoxyethylene ethanols, all preferably as alkali metal salts, such as the sodium salts. A list of such detergents is found in U.S. Pat. No. 3,637,339, hereby incorporated by reference. The water soluble higher fatty acid soaps, such as the sodium soaps of higher fatty acids of 12 to 18 carbon atoms, may also be employed as anionic detergents in the present compositions.

Nonionic detergent compounds are often utilized in the present detergent compositions in mixture with a linear higher alkylbenzene sulfonate detergent and with any other suitable supplementing anionic detergent present. The nonionics will normally be lower alkylene oxide condensation products, such as polyethylene oxides, which may sometimes have polypropylene oxide present but only to such an extent that the product is still water soluble. Preferred examples of such materials are the higher fatty alcohol-polyethylene oxide condensates wherein the higher fatty alcohol is of 10 to 18 carbon atoms, preferably 12 to 15 carbon atoms and the ethylene oxide portion thereof is a chain of 6 to 30 ethylene oxide units, preferably 7 to 15 ethylene oxide units and more preferably about 10 to 13 ethylene oxide units. For example, a preferred nonionic detergent of this type is Neodol®45-11, manufactured by Shell Chemical Company, which is a higher fatty alcohol polyethoxyethanol containing about 11 ethylene oxide groups per mol (including the ethoxy of the ethanol) and having an average of about 14 to 15 carbon atoms in the higher fatty alcohol. Alternatively, one may employ secondary nonionic detergents and surface active agents, such as Tergitol®15-S-9 and also Alfonic ®1618-65 and other nonionics such as the Pluronics®, e.g., Pluronic F-68. Also useful are similar ethylene oxide condensates of phenols, such as nonyl phenol or isooctyl phenol, sold as Igepals®, but these are not preferred.

In addition to the anionic and nonionic detergent compounds which may be employed in the present compositions there may also be utilized amphoteric and cationic detergents, which are well known and, like the anionic and nonionic detergents, builders, adjuvants and other intended components of the present compositions, are described in the text *Surface Active Agents and Detergents*, Vol. II, by Schwartz, Perry and Berch, published in 1958 by Interscience Publishers, Inc., especially at pages 25-138, and in *Detergents and Emulsifiers*, 1969-1973 Annuals, by John W. McCutcheon.

The use of an anti-redeposition agent in the invented compositions is especially important because of the presence in the wash waters of insoluble, depositable particulate materials, including the molecular sieve zeolite. Of the known anti-redeposition agents the most preferable to employ is sodium carboxymethyl cellulose but also useful, either as partial or complete substitutes for the sodium carboxymethyl cellulose (and only minor substitution is preferred) are polyvinyl alcohol, polyvinyl acetate (which hydrolyzes to the alcohol), polyvinyl pyrrolidone, lower alkyl celluloses, e.g., methyl cellulose, ethyl cellulose, and hydroxy-lower alkyl lower alkyl celluloses, e.g., hydoxypropyl methyl cellulose, hydroxyethyl ethyl cellulose. In such latter cellulose compounds the lower alkyl groups are usually of 1 to 3 carbon atoms.

In addition to the molecular sieve zeolite and silicate, other builder salts may also be present in the invented compositions. Normally these are water soluble and alkali metal salts, preferably the sodium and potassium salts of non-phosphorus-containing inorganic acids, e.g., sodium carbonate, potassium bicarbonate, borax. However, sometimes borax is omitted for ecological reasons, as in Florida, and for such reason the carbonate peroxide and percarbonate may also be preferred there. Organic builders may also be utilized in the present compositions, such as trisodium nitrilotriacetate or NTA (which is still not approved for general use in detergents), sodium citrate, potassium gluconate and hydroxyethyl iminodiacetate, disodium salt. Of course, filler salts, such as sodium sulfate and sodium chloride, are normal constituents of detergent compositions and may be employed.

Various adjuvants may be present for their special activities, such as enzymes, e.g., proteolytic enzymes (proteases) and amylotic enzymes (amylase); hydrotropes, e.g., sodium toluene sulfonate; wetting agents; flow-improving agents, e.g., clays (although the molecular sieve zeolite usually performs such function satisfactorily in the proportion employed); bactericides; fungicides; fluorescent brighteners; dyes; pigments; perfumes; emollients; stabilizers; fillers; coating agents; and softeners.

The proportions of the various components of the present compositions should be held within the following described ranges for good activities. The product should comprise (it may often consist essentially of) about 5 to 25% of higher linear alkylbenzene sulfonate, preferably 8 to 15% thereof and more preferably about 9%; about 12 to 25% of molecular sieve zeolite, preferably 14 to 18% thereof and more preferably about 16%; about 12 to 22% of percompound oxidizing agent, preferably 14 to 18% thereof and more preferably about 16%; and about 5 to 20% of the sodium silicate, preferably 12 to 17% thereof and more preferably about 15%. In preferred compositions there will also be present about 0.5 to 4% of higher monohydric alcohol polyethoxylate, preferably 1 to 3% and more preferably about 2%; and about 0.3 to 3% of organic anti-redeposition agent, e.g., sodium CMC, preferably 0.3 to 1.5% and more preferably 0.5%. The invented detergents will usually contain about 15 to 60% of inorganic salt filler, preferably 25 to 45% thereof and more preferably about 32%. Higher fatty acid soap may be present and when present the content thereof will normally be from 0.3 to 3%, preferably 0.5 to 2% and more preferably about 1%. The moisture content may vary from 0.5 to 15%, usually being in the range of 2 to 10%, preferably being 3 to 8%, e.g., 7%, as "free moisture". When supplementary builders, such as inorganic builder salts of the types previously mentioned, are present this will usually be in a proportion up to $\frac{2}{3}$ the previously stated filler salt content and will replace an equal proportion of filler salt. Any adjuvants present will normally total about 1 to 10%, with individual adjuvants generally being in the range of 0.01 to 5%. For example, the content of fluorescent brighteners or optical dyes may be in the range of 0.01 to 2%, normally being about 0.5 to 1.5%. The total of adjuvants is preferably in the range of 1 to 5%, such as 2 to 4% and typically about 2.5% thereof may be present, including fluorescent brighteners, perfumes, colorants and optionally, fungicides, bactericides and emollients.

The ratios of the various components, alkylbenzene sulfonate:molecular sieve zeolite:percompound oxidizing agent:sodium silicate:nonionic detergent:anti-redeposition agent:higher fatty acid soap:filler salt will usually be in the range of 0.2 to 1.5:1:0.4 to 2:0.4 to 2:0.05 to 0.3:0.01 to 0.1:0.03 to 0.1:0.5 to 3, preferably 0.3 to 1:1:07 to 1.4:0.7 to 1.4:0.08 to 0.2:0.02 to 0.05:0.04 to 0.08:0.8 to 2.5, more preferably, about 0.5:1:1:1:0.1:0.03:0.06:2. Of course, the ratios of components given are to be applied in formulating compositions within the percentage ranges previously recited and mixtures of the various particular components may be employed. While the percentages and ratios are applicable to the various components of the composition it is also possible that when percompounds of greater or lesser active oxygen content than sodium perborate tetrahydrate, on which the present percentages are based, are utilized, the proportions thereof present will be adjusted accordingly.

The various components of the detergent compositions may be blended together by admixing powdered compounds but preferably crutcher mixes of most of the components are spray dried, spray cooled, drum dried or otherwise converted to globular spray dried form. Alternatively, the various components may be co-size-reduced to the desired particle size ranges. Normally, perfume, nonionic detergent, flow promoting agent (if any is utilized, in addition to the molecular sieve zeolite), percompound and any other heat-sensitive components will be post-added to the tumbling spray dried detergent composition. However, in some cases it may be desirable to promote flow of the product by post-adding a proportion of the molecular sieve zeolite, e.g., 10 to 25% of the amount of molecular sieve zeolite in the final product, such as 3% when 16% is in the formula.

The globular particles of detergent compositions may be classified or sieved so that over 90%, preferably over 95% and most preferably, all thereof, passes through a No. 8 or No. 10 U.S. Standard Sieve Series sieve and less than 10%, preferably less than 5% and most preferably, 0% passes through a No. 100 sieve. The rest of the product, which may be post-added, if in the solid state, will normally be in powder form, with the molecular sieve zeolite powder component being of the size previously mentioned, e.g., from 5 to 9 microns in diameter, and the other powdered products being such that they will pass through a No. 100 sieve and fail to pass a No. 400 sieve, preferably passing through a No. 140 sieve and resting on a No. 325 sieve. When the nonionic detergent is in liquid form or may be readily liquefied, it may be desirable to spray it onto the surfaces of the tumbling detergent globule-powder mixture.

The washing methods of this invention may be carried out at various pH's and concentrations of the detergent composition in washing liquid medium but normally the pH will be in the range of 8 to 12, preferably 8.5 to 10.5 and most preferably 9 to 10.5. The concentration of the detergent composition in the aqueous washing medium, which will usually be ordinary tap water, will normally be from 0.05 to 2%, preferably being about 0.1 to 1%. Most preferably, such concentration will be about 0.15% in the United States and about 0.8% in European countries wherein high concentrations of detergent and low volumes of wash water have been employed in the conventional washing machines. Usually the laundry:wash water ratio will be from 0.03 to 0.2, preferably 0.04 to 0.1, e.g., 0.05 or 0.06 for United States laundry practices and about one to five times these ratios, e.g., about three times such ratios, for European practices. Materials washable with the invented compositions include cottons, polyesters, cotton-polyester blends, e.g., 35:65 and 55:45 blends, permanent press fabrics and all usual commercial fabrics.

The present compositions are employed in the same manner as comparable commercial heavy duty laundry detergents. Thus, they may be used for cold, warm and hot water washing, usually in the temperature range of 10° to 70° C. Excellent cold and warm water washings of various types of fabrics result, using ordinary automatic washing machines and normal washing times, 3 to 45 minutes, preferably being from 5 to 20 minutes in the United States and from 20 to 40 minutes according to European practices.

Various advantages of the invented compositions have already been mentioned. The presence of the molecular sieve zeolite appears to help to prevent staining of white or light goods with stains which might be removed from colored goods or laundry containing colored soils. In the presence of the percompound and other detergent composition constituents, the molecular sieve zeolites appear to preferentially adsorb the color bodies and thereby prevent them from being deposited on the white or lighter colored goods, resulting in a lesser amount of discoloration thereof. Also, the lowered content of molecular sieve zeolite results in less deposition thereof on the clothing and the proportion of anti-redeposition agent present is capable of maintaining most of the molecular sieve zeolite in suspension in the wash water so that it does not become entrapped in the fabrics being cleaned (which could occur during rinsing). The presence of the linear alkylbenzene sulfonate detergent appears to assist in maintaining the suspension of the molecular sieve zeolite too. Of course, the combination of the zeolite builder and the percompound, together with the silicate, adapts the product for best building and detersive activities, being useful against both calcium and magnesium hardness, and additionally promotes such building and cleaning or whitening of laundry by the detergent or detergent mixture. The use of a percompound results in a desirable increase in the desired properties of the detergent compositions. Thus, there are significant coactions between the various components in the proportions and ratios in which they are employed in the present detergent compositions and such would not be obvious from prior art.

The invention will be further illustrated by the following examples. Unless otherwise indicated, all parts therein and in the specification are by weight and all temperatures are in °C.

EXAMPLE 1

A preferred detergent composition of this invention is made by spray drying an aqueous crutcher mix of most of the components thereof, except for the percompound, nonionic detergent, perfume and a portion of the molecular sieve zeolite (15% thereof) used to promote flowability of the product. The crutcher mix is at a solids content of about 60% and spray drying is done in a countercurrent spray tower utilizing drying air at about 250° C. Spray drying is to a moisture content of about 9%, after which the percompound and the zeolite portion are blended with the product and the nonionic detergent and perfume are sprayed onto the tumbling mixture to be evenly distributed throughout. The spray dried product is sieved to be of a size which passes through a No. 10 sieve and to have less than 10%, e.g., 5%, retained by a No. 100 sieve, U.S. Standared Sieve Series. The perborate is a finely divided powder of sizes between 140 and 325 mesh, as are the other powder components, except the zeolite, which is of 6.4 to 8.3 microns in diameter. The formula of the product made follows:

| COMPONENT | PERCENT |
|---|---|
| Sodium linear tridecylbenzene sulfonate | 9 |
| Neodol 45-11[1] | 2 |
| Sodium silicate ($Na_2O:SiO_2$ = 1:2.35) | 15 |
| Type 4A molecular sieve zeolite[2] | 16 |
| Sodium perborate tetrahydrate | 16 |
| Sodium higher fatty acid soap[3] | 1 |
| Sodium carboxymethyl cellulose | 0.5 |
| Sodium sulfate | 32 |
| Fluorescent brightener | 1.1 |
| Miscellaneous adjuvants[4] | 1.4 |
| Moisture | 6 |

[1]Higher fatty alcohol polyethoxy ethanol wherein the higher fatty alcohol is of 14-15 carbon atoms and there are 11 ethoxy groups in the ethoxy ethanol moiety.
[2]Partially hydrated, containing 20% moisture in the crystals thereof.
[3]Made from a mixture of four parts of hydrogenated tallow and one part of hydrogenated coconut oil.
[4]Dye, pigment, preservative, perfume, etc.

Test washings of mixed laundry having an artificial test soil deposited thereon are conducted in a 1 liter capacity laboratory washing machine. The "laundry" is composed of 6 cm. by 6 cm. test swatches of cotton and cotton/polyester permanently pressed fabrics (cotton:-polyester ratio of 35:65). The detergent concentration in the wash water is 0.15%, the water employed has 150 parts per million of hardness (the calcium:magnesium hardness ratio, calculated as calcium carbonate, being 3:2), the temperature is maintained at 49° C. and washing is continued for ten minutes in a laboratory Terg-O-Tometer® washing machine. At the end of washing the wash water has a pH of 9.6. The test fabrics washed are rinsed and dried in a normal manner and are read for whiteness (Rd on the Gardner Color Difference Meter). The Rd for the preferred experimental composition described is 34.1 for soil removal from cotton and 85.3 for cotton and 85.1 for cotton/Dacron® for anti-redeposition. The anti-redeposition tests are on white fabric washed together with the soiled fabric and the determination made is of the whiteness of the white fabric, as it might be adversely affected by deposition thereon of some of the soil removed from the test fabric.

From the test results it is seen that the experimental product is almost as good in soil removal properties as a comparable product based on pentasodium tripolyphosphate builder salt (wherein the quantity of molecular sieve zeolite and sodium perborate tetrahydrate is replaced by pentasodium tripolyphosphate), in which case Rd is 36.6. The present experimental compositions are superior to the pentasodium tripolyphosphate-based detergent composition in anti-redeposition values, those for the phosphate formula being 84.2 for cotton and 83.9 for cotton/Dacron.

In practical laundry tests the described experimental composition is also almost as good as the phosphate-containing product in removing various types of soils from the laundry. In such tests, the water temperature ranges from 10° to 60° C., the hardness thereof is from 50 to 250 parts per million of calcium carbonate (mixed calcium and magnesium hardness), the washing times are from 5 to 45 minutes, machines employed are top loading and side loading, the detergent composition: laundry weight ratio is from 0.02 to 0.05 and the laundry: was water ratio is from 0.04 to 0.1. No objectionable deposits of molecular sieve zeolites result on laundry which is machine washed and subsequently line dried, even when the washing is in cold water, and of course, no such deposits are found on such laundry which is dried in an automatic clothes dryer.

When, in place of the mixture of zeolite and percompound there is utilized all zeolite (34% of molecular sieve zeolite type 4A instead of 17% of such zeolite and 17% of sodium perborate tetrahydrate) the soil removal Rd value is 37.0 and the anti-redeposition Rd values, on cotton and cotton/Dacron, respectively, are 84.8 and 84.6. Thus, the remarks made with respect to the comparison of the experimental formula and the phosphate formula also apply.

The whitening power of the composition can be improved by improving the apparent brightness by utilizing a greater content of the fluorescent brightener or supplemental fluorescent brighteners, e.g., Tinopal RBS (Geigy). Stain removal and soil removal are also improved by the addition to the composition of about 1% of Alcalase® proteolytic enzyme. Of course, further improvement results when the proportions of one or more of sodium perborate tetrahydrate, sodium silicate and anionic detergent (LAS) are increased further within the ranges given in the specification.

In variations of the above formula for the preferred inventive product the Neodol, soap, adjuvants, including fluorescent brightener, are omitted and the product is an effective heavy duty laundry detergent. Similarly, when the sodium carboxymethyl cellulose is removed anti-redeposition Rd values are diminished but good washing is still obtained. However, when any of the four major components, the LAS, zeolite, silicate or percompound is removed from the formulation or when the amount thereof is outside the range specified, on the lower side thereof, poorer washing is obtained and when more than a required proportions are utilized a less balanced, less efficient and less economic formulation results, with larger quantities of zeolite outside the ranges of the invented compositions resulting in objectionable deposition on the laundry, as has been described.

In further variations of the formula anhydrous type 4A molecular sieve zeolite (2% moisture content), a lesser hydrated type 4A zeolite (12% moisture content), a "completely" hydrated type 4A zeolite (22% moisture content) and a more completely hydrated type 4A zeolite (25% moisture content) are substituted and good built heavy duty laundry detergents are obtained without undesirable "boardiness" of the washed products and without excessive muting of the colors of colored laundry washed (caused by excessive redeposition of particulates from the laundry, wash water and the detergent composition). Instead of the mentioned type 4A zeolites, other type A zeolites and those of types X, Y and L are also utilizable as substitutes for the 4A zeolites, with useful detergents resulting. Mixtures of the different types of zeolites, e.g., a mixture of hydrated (20%) and non-hydrated (2%) type 4A zeolites may be employed, as may be a mixture of types A, X and Y zeolites. Despite the utility of the anhydrous zeolites it is preferred that the hydrated compounds be used because they appear to exhibit their building effects quicker, when added to the wash water, since they do not have to undergo preliminary hydration therein.

In still other variations of the formulas of the invention mixtures of different linear alkylbenzene sulfate detergents are employed, e.g., 50:50 mixtures of sodium linear dodecylbenzene sulfonate and sodium linear tridecylbenzene sulfonate; mixtures of silicates are utilized, e.g., 50:50 mixtures of sodium silicates of $Na_2O$:$SiO_2$ ratios of 1:2.0 and 1:2.4; and mixtures of percompounds are present, e.g., 50:50 mixtures of sodium perborate tetrahydrate and sodium precarbonate. Also, the sulfate is replaced, to the extent of one-third of the content thereof, by sodium chloride. Additionally, together with the 0.5% of sodium CMC present, there is employed an equal weight of either polyvinyl pyrrolidone, polyvinyl alcohol or sodium hydroxyethyl methyl cellulose. In some compositions up to 10% of the sodium sulfate present is replaced by sodium carbonate or sodium bicarbonate. In all such cases useful detergent products are obtained and the desirable effects of the percompound are obtained on the zeolite-LAS-silicate compositions in the proportions within the ranges described.

EXAMPLE 2

The compositions of Example 1 are made but with the substitution of an equal weight of sodium carbonate peroxide for the sodium perborate tetrahydrate in the basic formula and modifications given. In laboratory washing tests like those previously described the final washing pH is 9.8 the Rd value for soil removal is 36.1 and values for anti-redeposition are 85.4 and 85.1 for cotton and cotton/polyester, respectively. These results indicate that by utilization of sodium carbonate peroxide in amount the same as that of the perborate in Example 1, results are obtained which are essentially equal to those from an all-phosphate builder formula like the comparative formula previously discussed, which was compared with the experimental formula based on sodium perborate tetrahydrate. When the proportion of sodium carbonate peroxide is reduced to 14% in the product the soil removal Rd value and corresponding anti-redeposition values are about the same as those for the 17% sodium perborate tetrahydrate formula. Therefore, it appears that the sodium carbonate peroxide is more effective in the present formulations than the sodium perborate tetrahydrate.

Variations of the sodium carbonate peroxide formula given in this example, made in accordance with the descriptions of such variations in Example 1, give substantially the same results, with better soil removal effects when the same quantities of the carbonate peroxide are employed as those of sodium perborate tetrahydrate, which had been utilized. In other modifications of the invented compositions some of the LAS is replaced with a sodium higher fatty alcohol sulfate (the higher fatty alcohol being of 16 carbon atoms) in one case, by sodium paraffin sulfonate (the paraffin being of 16 carbon atoms) in another case and by sodium alpha-olefin sulfonate (the olefin being of 16 carbon atoms) in a third case, with the proportions of LAS being maintained within the 5 to 25% range. Good detergent products of the desired characteristics result. Similarly, when an equal mixture of sodium perborate tetrahydrate and sodium carbonate peroxide, totalling 16% of the product, is utilized, the detergent composition produced is also effective in removing soil and in improving anti-redeposition characteristics over "control" products. Further variations in the formulations are made by increasing and decreasing the proportion of the LAS, molecular sieve zeolite, percompound oxidizing agent and silicate ±10%, ±20% and ±30%, within the percentage and ratio ranges given, and good detergents result. The moisture contents of the products are varied over the range of 2 to 10% and the product resulting is still free flowing. This is also the case when all of the molecular sieve zeolite is spray dried with the other stable detergent composition components and when 1% of finely divided clay is employed as a flow promoting agent. It is also true when the various solid components are not spray dried but are merely mixed together or co-size-reduced and the liquid products are sprayed onto surfaces thereof, while mixing.

EXAMPLE 3

| COMPONENT | PERCENT |
|---|---|
| Sodium linear dodecylbenzene sulfonate | 20 |
| Polyethoxylated higher alcohol[5] | 1 |
| Sodium silicate ($Na_2O$:$SiO_2$ = 1:2.4) | 15 |
| Sodium carbonate | 5 |
| Type 4A molecular sieve zeolite[2] | 17 |
| Sodium perborate tetrahydrate | 17 |
| Borax | 1 |
| Sodium carboxymethyl cellulose | 1 |
| Fluorescent brighteners | 0.7 |
| Sodium higher fatty acid soap[3] | 2 |
| Adjuvants, including stabilizer, perfume, dyes, pigments, etc. | 1 |
| Sodium sulfate | 13.4 |
| Moisture | 5.9 |

[5]The higher alcohol is a linear alcohol of 16 to 18 carbon atoms and the polyethoxy moiety includes 10.3 ethoxy groups per mol.

The above composition, a foaming non-phosphate detergent, is made by spray drying all the components except the sodium perborate, 1% of the molecular sieve zeolite and the perfume, with the unsprayed powdered materials then being blended with the spray dried product and with the perfume being sprayed onto the surfaces of the tumbling detergent beads and post-added powders. The product is of essentially the same particle size distribution as that described in Example 1 and when tested in the same manner results in a showing of improved detergency and anti-redeposition properties, compared to similar control compositions.

EXAMPLE 4

| COMPONENT | PERCENT |
|---|---|
| Sodium linear dodecylbenzene sulfonate | 18 |
| Polyethoxylated higher alcohol | 1 |
| Sodium silicate ($Na_2O$:$SiO_2$ = 1:2.4) | 15 |
| Sodium carbonate | 5 |
| Type 4A molecular seive zeolite[2] | 17 |
| Sodium perborate tetrahydrate | 17 |
| Sodium carboxymethyl cellulose | 1 |
| Fluorescent brighteners | 1 |
| Sodium higher fatty acid soap[3] | 3 |
| Adjuvants, including perfume, dyes, pigments, stabilizer, etc. | 1 |
| Sodium sulfate | 15 |
| Moisture | 6 |

The above composition, a low suds heavy duty detergent powder, is made in the same manner as described in Example 3. The product is of essentially the same size as that described in Example 3 and when tested in the same manner exhibits improved detergency and anti-redeposition properties, compared to similar control compositions. When variations in the formula of this example and that of Example 3 are made in the manner described in Examples 1 and 2 the invented products resulting are good heavy duty laundry detergents of improved properties, as desired. They are also free flowing, non-tacky, non-caking, stable compositions.

The invention has been described with respect to examples and illustrations thereof but it is not to be limited to these because it is evident that one of skill in the art will be able to utilize substitutes and equivalents without departing from the spirit of the invention.

What is claimed is:

1. The phosphate-free heavy duty synthetic organic detergent composition consisting of 9 percent sodium linear tridecylbenzene sulfonate, 1 percent fatty alcohol polyethoxy ethanol condensate having 14–15 carbon atoms in the fatty alcohol and 11 ethoxy groups in the polyethoxy ethanol moiety, 15 percent sodium silicate having an $Na_2O$:$SiO_2$ ratio of 1:2.35, 16 percent partially hydrated type 4A molecular sieve zeolite of about 6.4 to 8.3 microns in diameter, 16 percent sodium perborate tetrahydrate powder having a mesh size of from about 140 to 325 U.S. Standard Sieve Series, 1 percent sodium higher fatty acid soap prepared from a mixture of 4 parts by weight hydrogenated tallow oil and 1 part hydrogenated coconut oil, 0.5 percent sodium carboxymethyl cellulose, about 32 percent sodium sulfate, about 1 percent fluorescent brightener, about 1 percent of a mixture of washing dye, washing pigment, preservative and perfume, and about 6 percent moisture, said percents being weight percents relative to the total weight, wherein the sodium linear tridecylbenzene sulfonate, the sodium silicate, about 1 percent of the zeolite, the soap, the sodium carboxymethyl cellulose, the sodium sulfate, the brightener, the dye, the pigment and the preservative are in the form of spray-dried beads, the fatty alcohol polyethoxy ethanol condensate, and the perfume are absorbed into and coat the spray-dried beads, and about 15 percent of the zeolite and the sodium perborate tetrahydrate also are present as an overcoat on the spray-dried beads.

* * * * *